(12) United States Patent
Krull et al.

(10) Patent No.: US 8,177,057 B1
(45) Date of Patent: May 15, 2012

(54) COIN DISPLAY METHODS AND APPARATUS

(76) Inventors: Mark A. Krull, Bend, OR (US);
Gregory A. Welte, Frankfort, IN (US)

( * ) Notice: Subject to any disclaimer, the term of this patent is extended or adjusted under 35 U.S.C. 154(b) by 2401 days.

(21) Appl. No.: 10/427,037

(22) Filed: Apr. 29, 2003

Related U.S. Application Data (63) Continuation of application No. 09/440,496, filed on Nov. 15, 1999, now Pat. No. 6,554,130, which is a continuation of application No. 08/907,383, filed on Aug. 7, 1997, now Pat. No. 5,988,366.

(51) Int. Cl.
*A45C 1/00* (2006.01)
(52) U.S. Cl. .......................... 206/0.8; 206/0.83
(58) Field of Classification Search ............... 206/0.8
See application file for complete search history.

(56) References Cited

U.S. PATENT DOCUMENTS

| | | | | | |
|---|---|---|---|---|---|
| 2,998,126 | A | * | 8/1961 | Jenkins | 206/0.83 |
| 3,347,550 | A | * | 10/1967 | Carboni | 273/282.1 |
| 4,552,357 | A | * | 11/1985 | Di Egidio | 273/285 |
| D402,784 | S | * | 12/1998 | Saunders | D99/34 |
| D432,571 | S | * | 10/2000 | Cercone et al. | D19/30 |

OTHER PUBLICATIONS

"The States of the Union Penny Treasury", sold by Sears, dated at least Jan. 19, 1977.*

* cited by examiner

*Primary Examiner* — Mickey Yu
*Assistant Examiner* — Rafael Ortiz (57) ABSTRACT

A set of coins is arranged relative to a display having discrete regions associated with discrete coins within the set. In a preferred embodiment, the display is a map, and an opening is provided within the borders of or proximate to each state on the map in order to receive a respective coin.

3 Claims, 7 Drawing Sheets

COIN DISPLAY METHODS AND APPARATUS

CROSS-REFERENCE TO RELATED APPLICATIONS

This is a continuation of U.S. patent application Ser. No. 09/440,496, filed on Nov. 15, 1999, now U.S. Pat. No. 6,554,130, which in turn, is a continuation of U.S. patent application Ser. No. 08/907,383, filed on Aug. 7, 1997 (now U.S. Pat. No. 5,988,366).

FIELD OF THE INVENTION

The present invention relates to coin storage methods and apparatus and more particularly, to a system for displaying or storing a set of coins in relation to a depiction of geographic regions with which they are associated.

BACKGROUND OF THE INVENTION

Coin collecting is a popular hobby. Significant aspects of the hobby include the safe storage and attractive display of coins within a collection. One known method for storing coins is to provide circular openings cardboard or fiberboard sheets which are bound together by a flexible backing. The resulting "book" typically provides a date labeled opening or coin receiving depression for each year in which a particular coin was minted. This type of prior art book is suitable for its intended purpose, but room for additional innovation remains in the field of coin displays and/or storage systems.

SUMMARY OF THE INVENTION

One aspect of the present invention is to provide a map with coin holders associated with distinguishable regions on the map. Such an arrangement provides an attractive way to store coins and may facilitate greater appreciation of geography, as well. Many of the features and advantages of the present invention will become apparent from the more detailed description that follows.

BRIEF DESCRIPTION OF THE FIGURES OF THE DRAWING

With reference to the Figures of the Drawing, wherein like numerals represent like parts and assemblies throughout the several views.

DETAILED DESCRIPTION OF A PREFERRED EMBODIMENT

The present invention provides methods and apparatus for storing and/or displaying coins in relation to geographic territories associated with the coins. In a broader sense, the present invention provides methods and apparatus for storing a collection or set of tokens in relation to an illustration having distinct regions which are unique to respective tokens within the collection or set. Several examples of the invention are discussed below.

Figure 1:
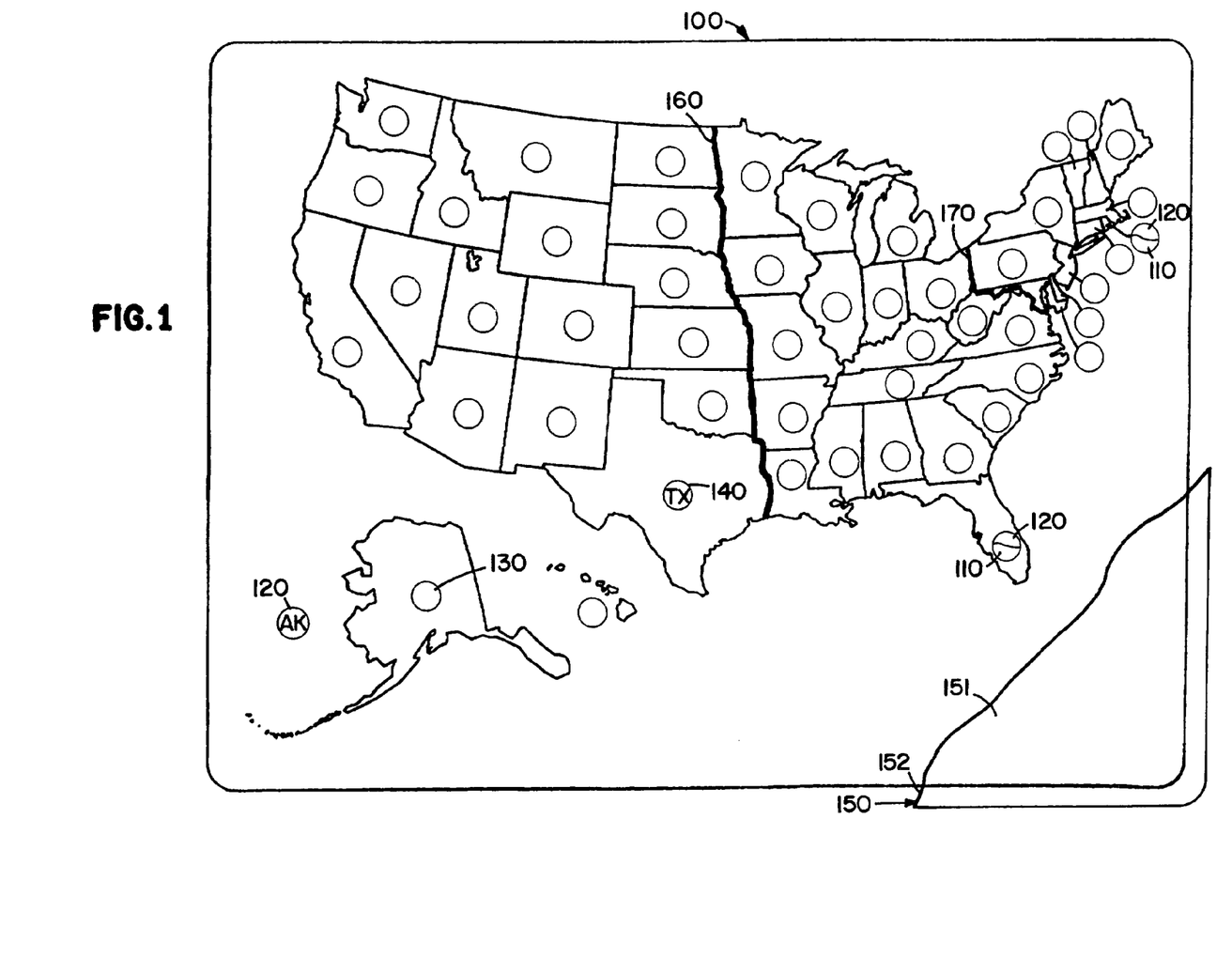
FIG. 1 is a top view of a first storage and display system constructed according to the principles of the present invention, with portions of a cover and a coin having been broken away.

FIG. 1 shows a rectangular board or panel 100 which is made of cardboard or some other suitable material. The board 100 bears outlines of the continental United States of America and each individual state within the union. As shown with reference to Florida and Rhode Island, a separate opening 110 is provided in the board 100 for each of the fifty states. In this embodiment, each opening 110 is sized and configured to receive (by press fit) a disc 120 identical in size and shape to a 1997 United States quarter (approximately 15/16 of an inch in diameter and 1/16 of an inch deep or thick).

Those skilled in the art will recognize that a different size of disc and opening may be used without departing from the scope of the present invention. In any event, a preferred method of scaling a generally true to scale map relative to the disc involves making the longitudinal distance defined between the laterally extending, northern and southern borders of Tennessee at least as large as the diameter of the disc. Those skilled in the art will recognize that other scaling methods may be employed in the alternative.

Where space permits, as is the case with Florida in FIG. 1, the opening 110 is disposed within the border of the respective state. Where space is insufficient, as is the case with Rhode Island in FIG. 1, the opening 110 is disposed proximate the respective state, preferably in a manner that causes minimal obstruction of boundaries between states. A leader line and/or color code may be used to associate "displaced" openings with their respective states.

As shown with reference to Alaska in FIG. 1, the associated disc 120 having been removed from the opening 110, the board 100 includes an optional backing material 130 to prevent the discs 120 from passing entirely through the openings 110. Those skilled in the art will recognize that relatively smaller openings may be provided in the backing material 130 to facilitate removal of the discs 120 as desired.

The map 100 serves as an attractive and educational way to store and display "quarter-sized" objects which are distinguishable on a state by state basis. For example, each coin may bear the name and/or outline of its respective state, or some other symbol associated with the state. Such objects may be produced and distributed by a private entity, in which case the discs 120 may be made of any of a variety of materials, including metal, plastic, or wood. For example, a restaurant chain such as McDonald's could distribute a different state coin or token each week for almost an entire year, thereby requiring customers to patronize a McDonald's restaurant each week for a year in order to obtain the entire collection of state specific tokens.

The present invention may also be provided in the form of a game or kit, wherein the board 100 and all the tokens 120 are distributed together. The tokens 120 could already occupy their proper openings 110; or they could be randomly disposed in the openings 110; or they could be free of the openings 110. In the event that tokens or coins are distributed over time, maps could be made available to tardy collectors with an up to date stock of those coins already distributed.

Those skilled in the art will recognize that the United States government could mint distinct quarters associated with particular states (an idea that is being considered in the 1997 Congress). The map 100 would provide a convenient and educational way to store and display such quarters. Those skilled in the art will also recognize that the coins may be encased in acrylic, for example, for preservation purposes, in which case the openings 110 would be sized accordingly.

As shown with reference to Texas in FIG. 1, an inexpensive replica 140 of each actual coin (or token) may be initially provided together with the map 100 to occupy the openings 110 in the absence of the actual coins or tokens. Such a replica could be made of a less expensive material than the real thing or could simply be an embossed piece of foil.

An optional cover 150 is shown together with the board 100 in FIG. 1. The cover 150 is made of a transparent material such as acrylic and is formed with a depression or cavity sized and configured to receive the board 100. In other words, a relatively thinner portion 151 of the cover 150 spans the board 100, and a relatively thicker portion 152 of the cover 150 surrounds the board 100.

Those skilled in the art will recognize a variety of alternative arrangements for enclosing the tokens 120. For example, the map could be part of a plastic tray, and the cover could be pivotally mounted on the tray. Another option would be to simply provide a cover or overlying support into which the tokens are inserted from behind and retained in place by snap fit. Such a cover could be configured to approximate the topography of the region it represents, with a flat portion provided for display of each of the coins or tokens.

Figure 2:
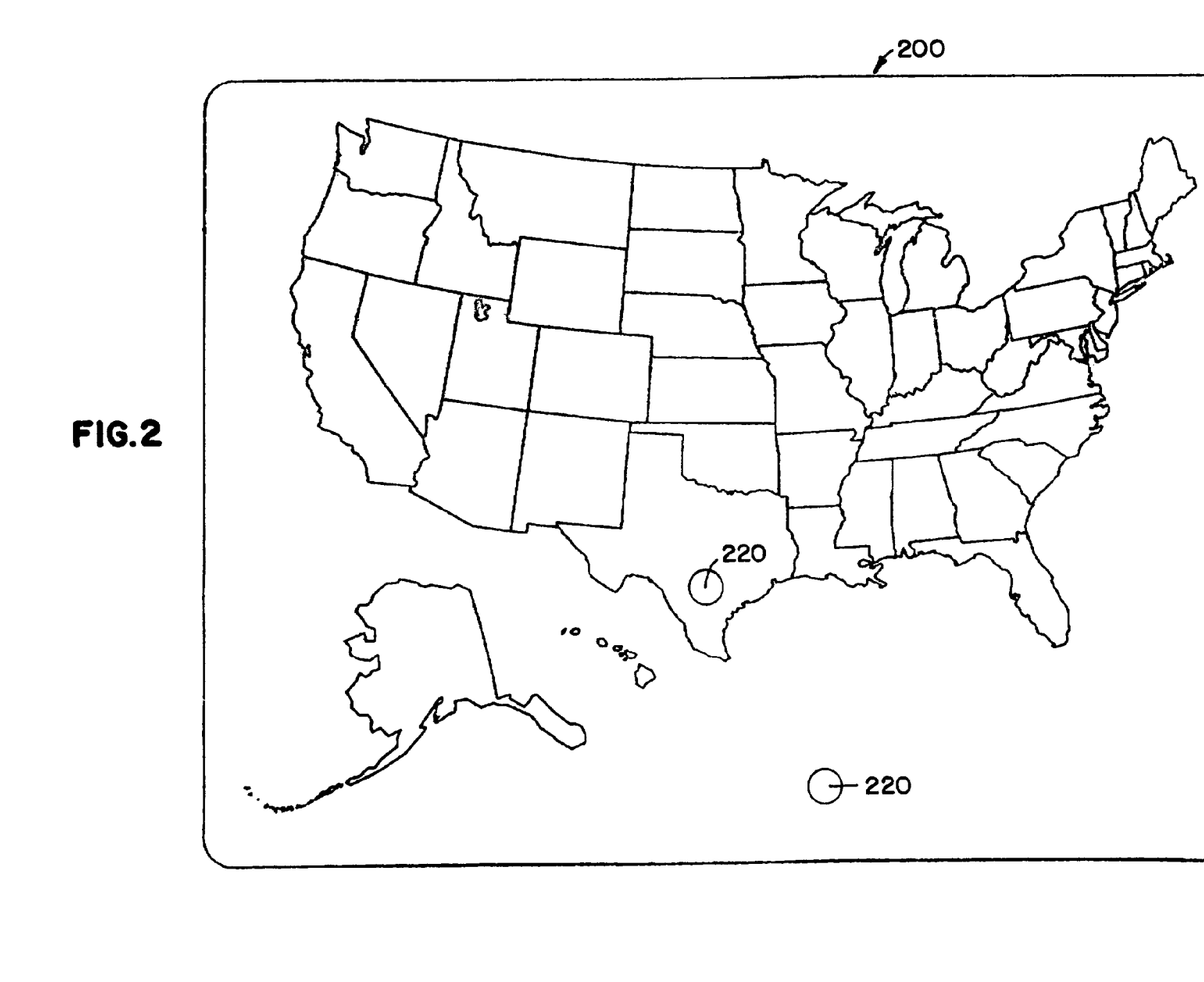
FIG. 2 is a top view of a second storage and display system constructed according to the principles of the present invention.
Figure 3:
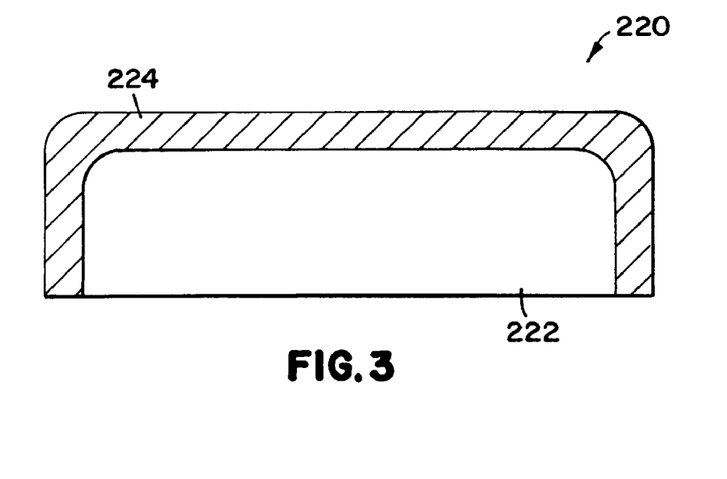
FIG. 3 is a sectioned side view of a token suitable for use with the system of FIG. 2.

Another variation of the present invention is to secure the tokens to a map or board by magnetic force. For example, FIG. 2 shows a map or board 200 made of ferrous metal. As shown in FIG. 3, each of a plurality of "region specific" tokens 220 includes a magnet 222 disposed within a plastic housing 224. The arrangement allows the tokens 220 to be connected to and removed from the board 200. Those skilled in the art will recognize that designated coin spaces or outlines could be shown on the map 200. Alternatively, magnets could be disposed at specific locations on the board, or the entire board could be "magnetized" to support tokens made of ferrous metal. Yet another option would be to use hook and loop fasteners to retain the tokens in place.

Figure 4:
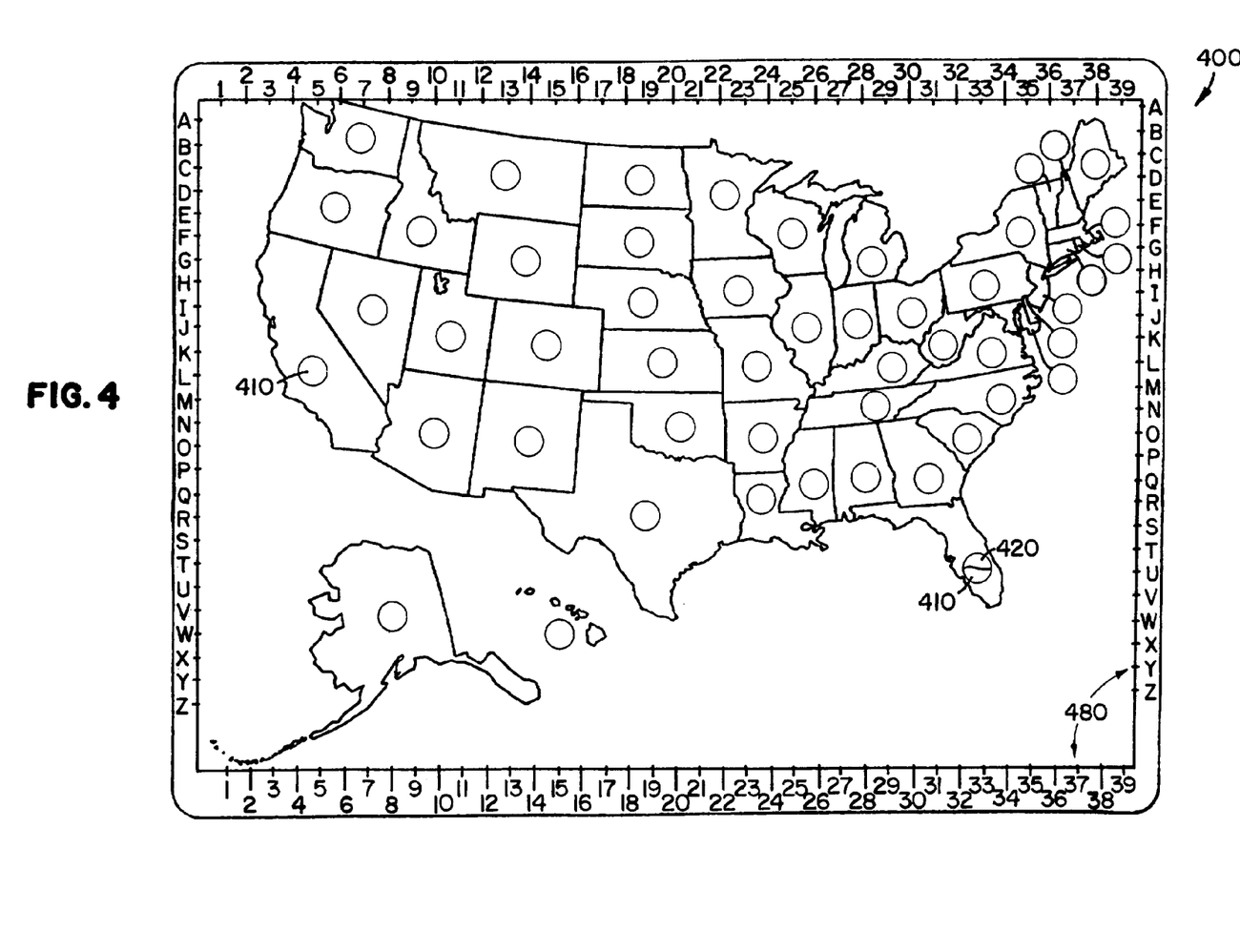
FIG. 4 is a top view of a third storage and display system constructed according to the principles of the present invention, with a portion of a coin having been broken away.

FIG. 4 shows another map or board 400 which is similar in many respects to the board 100 in FIG. 1. However, the board 400 further includes a locating means 480 for assisting a person with locating a particular state and/or token on the map 400. The locating means 480 includes coordinates disposed along at least two orthogonal edges of the board 400 and a list (not shown) of the states together with respective pairs of coordinates. For example, the token receiving opening 410 for California is at (5, L) in FIG. 4. Those skilled in the art will recognize that the coordinates could be placed on the cover 150 shown in FIG. 1 (rather than on the board itself).

Those skilled in the art will also recognize that numerous other locating means could be employed with similar results. For example, a longitudinally extending member could be slidably mounted to the lateral sides of the board, and a laterally extending member could be slidably mounted to the longitudinal sides of the board, and their point of intersection used to locate particular states.

The size of the coins or tokens and the relative sizes of the states may be such that it becomes desirable to split the map into more than one section or board, and/or to depict the northeast states in a relatively larger scale, for example. Along these lines, a relatively bold border line 160 is included in FIG. 1 to show a desirable line of separation between eastern states and western states; and a relatively bold border line 170 is included in FIG. 1 to show a desirable line of separation between northeast states which may require enlargement relative to the remainder of the states.

Figure 5:
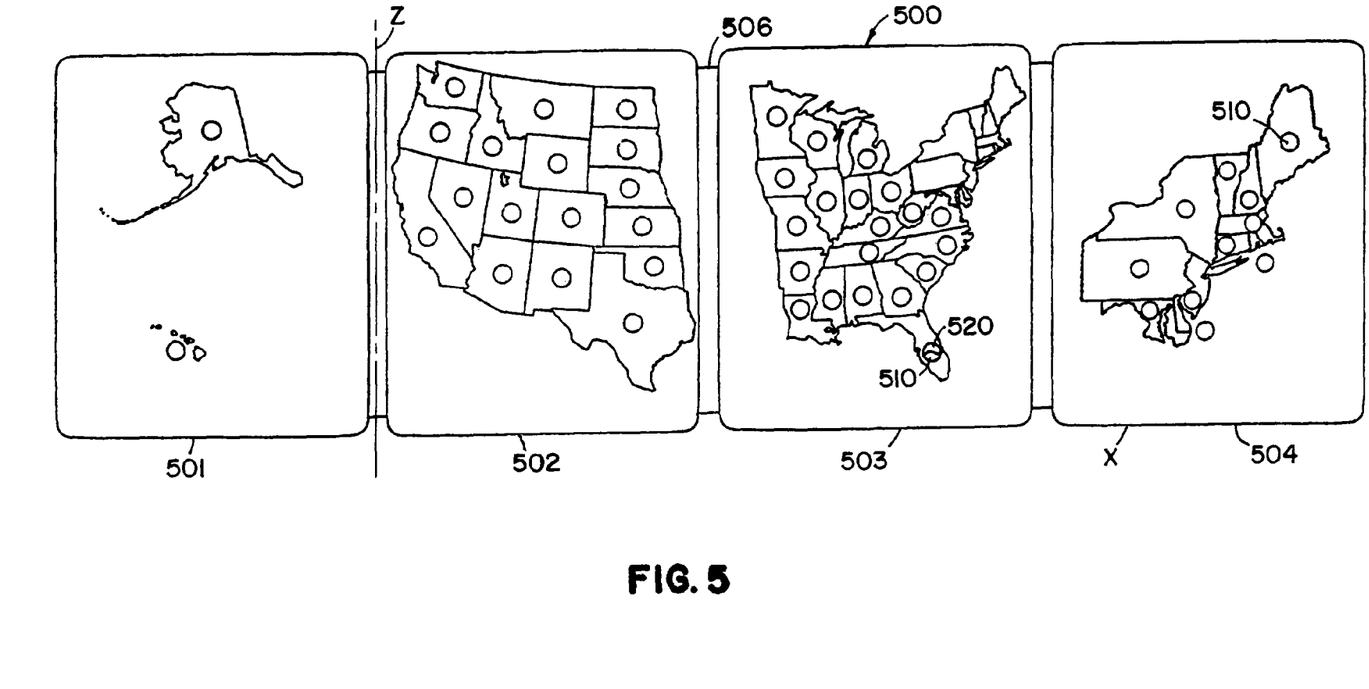
FIG. 5 is a top view of a fourth storage and display system constructed according to the principles of the present invention, with a portion of a coin having been broken away.

FIG. 5 shows a segmented map or board 500 having four discrete sections 501-504. Section 501 shows Alaska and Hawaii; section 502 shows the portion of the continental United States lying west of the border line 160; section 503 shows the portion of the continental United States lying east of the border line 160; and section 504 shows an enlargement of the northeast states lying northeast of the borderline 170. As shown with reference to Maine, the token receiving openings 510 for the enlarged northeast states are provided only in connection with the enlarged depiction thereof (and not in the section 503).

Adjacent sections of the map 500 are interconnected by a flexible backing material 506 which may be said to define a hinge between each adjacent pair of sections. For example, section 501 and section 502 are interconnected by the backing material 506 and are foldable relative to one another about an axis Z. Angling of the sections relative to one another (about axis Z, for example) allows the board 500 to be positioned upright on a horizontal surface with only its lower edge X engaging the surface. The hinges are wide enough to allow the sections 501-504 to be folded flat against one another, thereby reducing the area occupied by the map 500 to one-fourth its size in FIG. 5.

Figure 6:
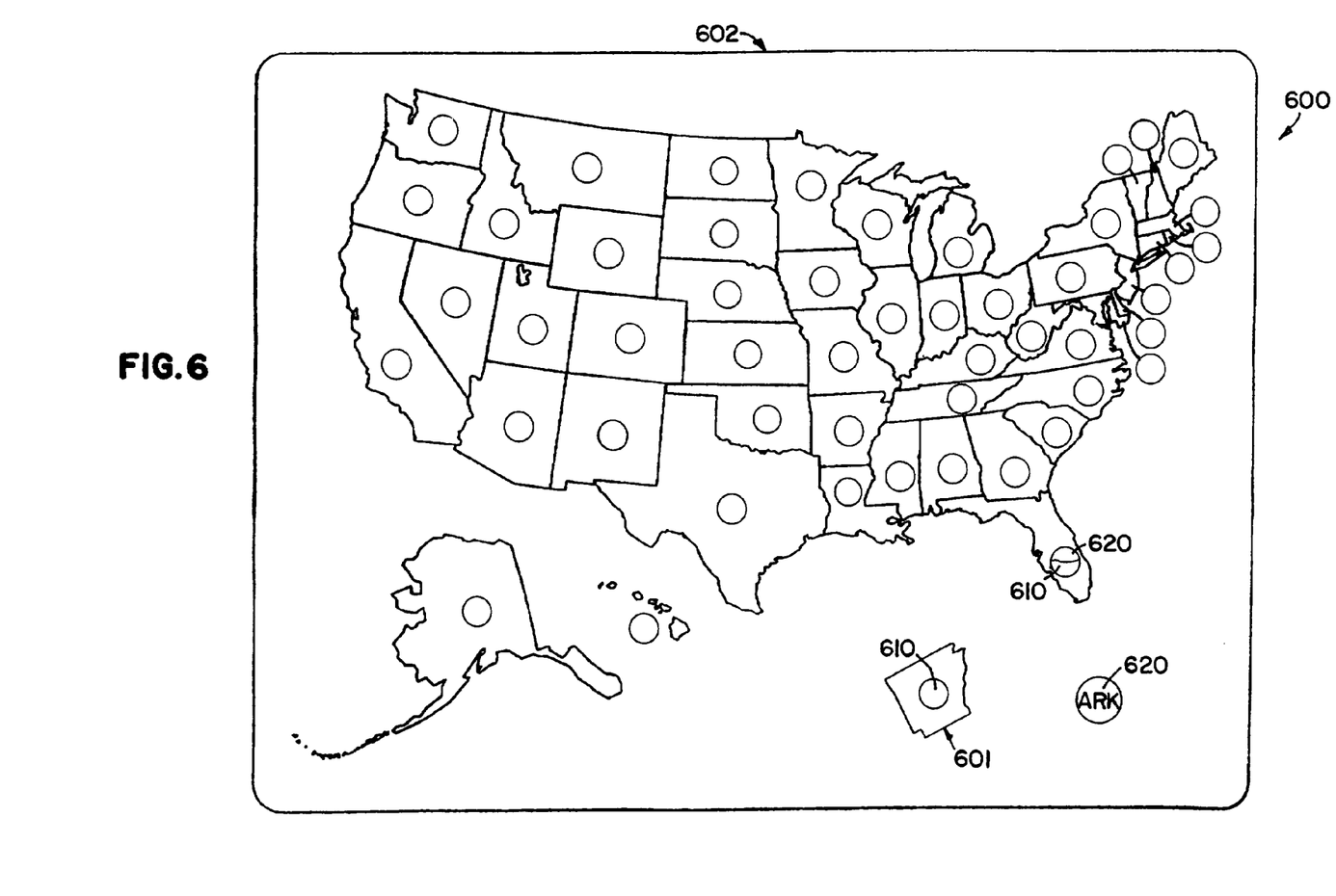
FIG. 6 is a top view of a fifth storage and display system constructed according to the principles of the present invention, with a portion of a coin having been broken away.

FIG. 6 shows a puzzle 600 which is similar in size and shape to the boards 100 and 200. However, as shown with reference to Arkansas, each state or select group of states is provided in the form of a puzzle piece 601 which is removable from the base or board 602 and separable from adjacent puzzle pieces. The entire map formed by the removable members 601 rests within a depression formed in the board 602. This embodiment 600 allows both sides of each coin or token 620 to be viewed without removing it from its opening 610. This embodiment 600 may also be seen to provide two levels of puzzle solving: one involving matching each token to its respective state; and the other involving locating each state relative to the overall map.

Several of the features discussed with reference to other embodiments may be integrated into the puzzle embodiment 600. For example, a cover may be added to help maintain the puzzle pieces 601 in place relative to the base 602. Alternatively, the tokens 620 and/or the pieces 601 may be connected to a base or any other suitable member, such as a refrigerator door, by means of magnetic force. In the latter case, no base or board is required. Yet another possible feature involves making sections of the map available together with newly introduced coins. For example, the map could be divided into ten discrete five state units or pieces, and one unit could be released each year together with the five related coins.

Figure 7:
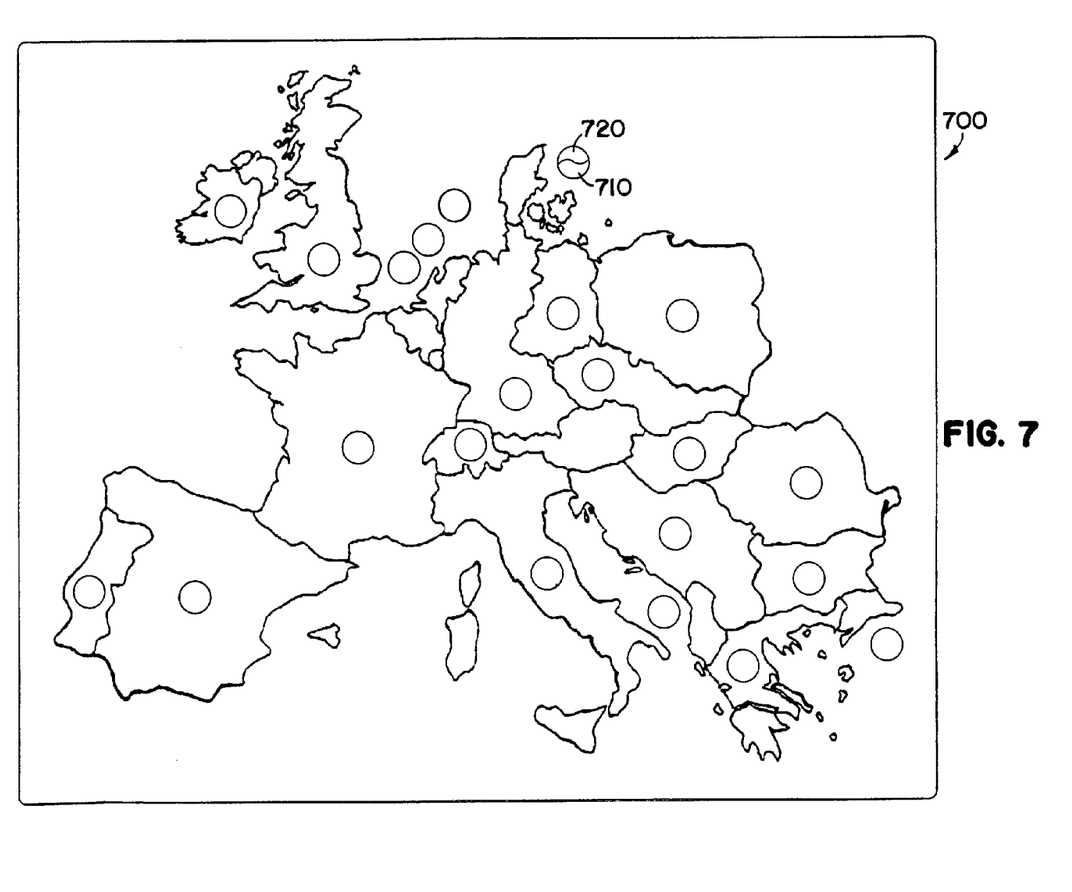
FIG. 7 is a top view of a sixth storage and display system constructed according to the principles of the present invention, with a portion of a coin having been broken away.

FIG. 7 shows a discrete map or board 700 which depicts somewhat outdated outlines of countries of Europe. As shown with reference to Denmark, an opening 710 is formed in the board 700 for each country shown on the map 700 in order to retain a respective token 720. Tokens 720 may be privately produced and distributed for each opening 710, or the board 700 may be used to store actual coins from each of the countries shown.

Recognizing that all such actual coins may not be identical in size and shape, either each opening must be sized according to the actual coin size of the respective country, or some sort of adaptive coin holder must be provided. The former case simply requires that the desired coin or coins be collected from each country, and then appropriate sized openings be formed in the map.

Figure 8:
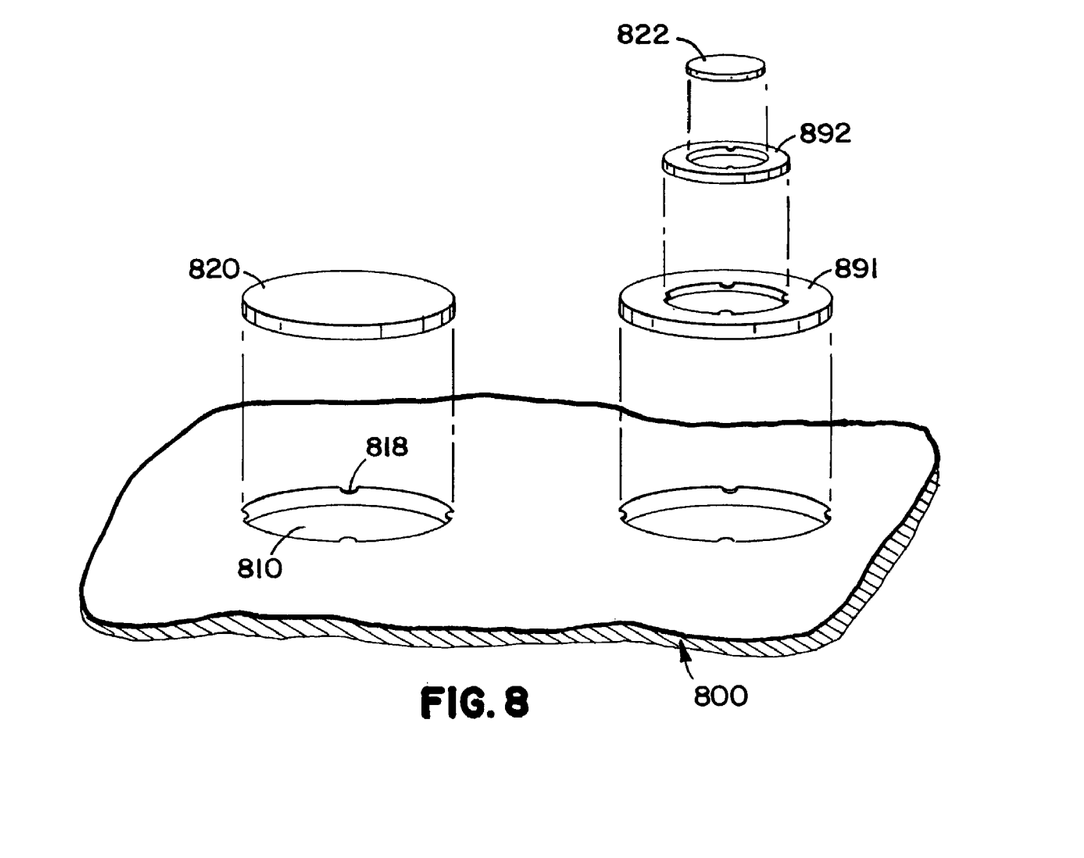
FIG. 8 is an exploded and fragmented view of a coin retaining assembly suitable for use with the system of FIG. 7.

The latter case may be addressed in a variety of ways. For example, as shown in FIG. 8, a board 800 is provided with openings which are sufficiently large to accommodate the largest anticipated actual coin 820. An alternative coin retaining arrangement is provided in the form of tabs 818 which extend radially inward from the edges of the openings 810 to retain appropriately sized coins by snap fit. Those skilled in the art will recognize that this particular arrangement may be substituted for or replaced by any of the retaining arrangements discussed above. In any event, one or more sizes of bushings 891 and 892 are provided to accommodate relatively smaller actual coins 822 and to similarly snap fit into any of the openings 810. Tabs similarly extend radially inward from the edges of the bushing openings to retain appropriately sized coins by snap fit.

The foregoing description will enable those skilled in the art will recognize additional improvements, modifications, and/or applications which nonetheless fall within the scope of the invention. For example, a map could be supported on spaced apart sheets of plastic which are interconnected by intermittent posts, and a toroid-shaped token could be inserted between the sheets of plastic and maneuvered into alignment with an appropriate hole through at least one of the sheets. A fastener could then be inserted through the hole in the sheet and a central opening through each token to secure the latter relative to the former. Or the tokens could be mounted on masts or posts which, in turn, are connected to the regions of the map. Or, the body of each player on a basketball team could be displayed on a board with an opening in place of each player's head, and a separate coin bearing each player's face could be distributed to complete the display. Or, a flexible member, such as a shirt or curtain with transparent pockets, could be used in place of a board or other rigid support, in which case the tokens are preferably made of a relatively lightweight material such a plastic. Recognizing that those skilled in the art will undoubtedly recognize many such variations, the scope of the present invention is to be limited only to the extent of the following claims.

What is claimed is:

1. A coin storage apparatus, comprising:
    a member having a planform that is associated with a particular state of the United States, wherein an opening in the member is sized and configured to receive a 1997 U.S. quarter; and
    a coin having a feature unique to the particular state, wherein the coin is sized and configured for insertion into the opening, and the coin is inserted into the opening.

2. The coin storage apparatus of claim 1, further comprising a second member having a planform that is associated with a second state in the United States, wherein respective portions of each said planform are complementary in shape, and an opening in the second member is sized and configured to receive a 1997 U.S. quarter; and a second coin having a feature unique to the second state, wherein the second coin is sized and configured for insertion into the opening in the second member, and the second coin is inserted into the opening in the second member.

3. A coin storage apparatus, comprising:
    a coin bearing a feature unique to a particular state in the United States; and
    a member shaped in a manner that is unique to the particular state, wherein an opening in the member is sized and configured to receive the coin, and the coin is inserted into the opening.

\* \* \* \* \*